US009367582B2

(12) United States Patent
Arning et al.

(10) Patent No.: US 9,367,582 B2
(45) Date of Patent: Jun. 14, 2016

(54) SYSTEMS AND METHODS INVOLVING INFORMATION OBJECTS

(75) Inventors: Andreas Arning, Boeblingen (DE); Peter Gerstl, Boeblingen (DE); Mike Grasselt, Boeblingen (DE); Albert Maier, Boeblingen (DE); Frank Neumann, Boeblingen (DE); Daniel Wolfson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1104 days.

(21) Appl. No.: 12/537,340

(22) Filed: Aug. 7, 2009

(65) Prior Publication Data

US 2011/0035411 A1 Feb. 10, 2011

(51) Int. Cl.
| | |
|---|---|
| *G06F 17/30* | (2006.01) |
| *G06F 21/62* | (2013.01) |
| *G06F 11/34* | (2006.01) |
| *G06F 9/44* | (2006.01) |
| *G06F 9/54* | (2006.01) |

(52) U.S. Cl.
CPC ............ *G06F 17/30386* (2013.01); *G06F 8/24* (2013.01); *G06F 9/54* (2013.01); *G06F 11/3447* (2013.01); *G06F 17/30362* (2013.01); *G06F 17/30595* (2013.01); *G06F 17/30607* (2013.01); *G06F 21/6218* (2013.01)

(58) Field of Classification Search
CPC .............. G06F 17/30; G06F 17/30595; G06F 17/30607; G06F 21/6218; G06F 11/3447; G06F 8/24; G06F 17/30362
USPC ........... 707/792, E17.055, 794–796, 803–807
See application file for complete search history.

(56) References Cited

U.S. PATENT DOCUMENTS

| | | | | | |
|---|---|---|---|---|---|
| 6,154,877 | A | * | 11/2000 | Ramkumar et al. .......... | 717/114 |
| 6,167,405 | A | * | 12/2000 | Rosensteel et al. | |
| 6,308,216 | B1 | * | 10/2001 | Goldszmidt ........ | H04L 12/2602 |
| | | | | | 709/224 |
| 6,591,275 | B1 | * | 7/2003 | Russell ............. | G06F 17/30595 |
| | | | | | 707/960 |
| 7,020,697 | B1 | * | 3/2006 | Goodman .............. | G06Q 10/10 |
| | | | | | 709/223 |
| 7,478,329 | B2 | * | 1/2009 | Stevens et al. ................ | 715/734 |
| 2003/0204645 | A1 | * | 10/2003 | Sharma ..................... | G06F 8/10 |
| | | | | | 719/328 |
| 2004/0030777 | A1 | * | 2/2004 | Reedy et al. .................. | 709/224 |
| 2004/0226027 | A1 | * | 11/2004 | Winter .......................... | 719/328 |
| 2004/0243693 | A1 | * | 12/2004 | Beisiegel ................ | G06F 9/465 |
| | | | | | 709/220 |
| 2005/0044197 | A1 | * | 2/2005 | Lai ............................... | 709/223 |

(Continued)

OTHER PUBLICATIONS

Boogie: A Modular Reusable Verifier for Object-Oriented Programs Mike Barnett, Bor-Yuh Evan Chang, Robert DeLine, Bart Jacobs and K. Microsoft Research, Redmond, \Washington, USA, 2006. pp. 364-387.*

(Continued)

*Primary Examiner* — Srirama Channavajjala
(74) *Attorney, Agent, or Firm* — Cantor Colburn LLP (57) ABSTRACT

A method includes receiving a request from a source service, determining whether the target service associated with the request supports a by-reference evaluation strategy, determining whether an information object associated with the request is a data reference, retrieving data associated with the reference from a database, adding the data to the information object, and invoking the target service and passing the information object to the target service responsive to determining that the target service does not support the by-reference strategy and the information object is a data reference.

17 Claims, 3 Drawing Sheets

(56) References Cited

U.S. PATENT DOCUMENTS

| | | | |
|---|---|---|---|
| 2005/0204054 A1* | 9/2005 | Wang et al. .................... | 709/232 |
| 2005/0238026 A1* | 10/2005 | Wu .......................... | H04L 47/10 370/395.2 |
| 2006/0041872 A1* | 2/2006 | Poznanovic et al. ........... | 717/140 |
| 2006/0080289 A1* | 4/2006 | Brunswig ......... | G06F 17/30286 |
| 2007/0011126 A1* | 1/2007 | Conner .................. | G06Q 10/00 706/47 |
| 2007/0242626 A1* | 10/2007 | Altberg et al. ................. | 370/259 |
| 2008/0046582 A1* | 2/2008 | Beisiegel ................. | G06F 8/00 709/230 |
| 2008/0046585 A1* | 2/2008 | Blumofe ............. | H04L 12/1818 709/231 |
| 2008/0091712 A1* | 4/2008 | Daherkar .......... | G06F 17/30362 |
| 2008/0141333 A1* | 6/2008 | Chen .................... | G06F 21/6218 726/1 |
| 2008/0181116 A1* | 7/2008 | Kavanaugh et al. .......... | 370/236 |
| 2008/0270289 A1* | 10/2008 | Petrino .......................... | 705/37 |

OTHER PUBLICATIONS

Guijun Wang et al., "Integrated Quality of Service (QoS) Management in Service-Oriented Enterprise Architectures", Proceedings of the 8th IEEE Intl Enterprise Distributed Object Computing Conf (EDOC 2004), 12 pages.*

Mike Barnett et al., "Boogie: A Modular Reusable Verifier for Object-Oriented Programs", FMCO 2005, LNCS 4111, pp. 364-387, 2006, Springer-Verlag Berlin Heidelberg 2006, pp. 364-387.*

* cited by examiner

SYSTEMS AND METHODS INVOLVING INFORMATION OBJECTS

BACKGROUND

The present invention relates to service component architecture (SCA), and more specifically, to managing information objects in a SCA.

SCA uses linked services (source services and target services) that send and receive data in information objects. Some services process data using a call-by-value evaluation strategy, while others process data using a call-by-reference evaluation strategy. A method and system that improves the compatibility of SCA services that use different evaluation strategies is desired.

BRIEF SUMMARY

According to one embodiment of the present invention, a method comprises receiving a request from a source service, determining whether the target service associated with the request supports a by-reference evaluation strategy, determining whether an information object associated with the request is a data reference, retrieving data associated with the reference from a database, adding the data to the information object, and invoking the target service and passing the information object to the target service responsive to determining that the target service does not support the by-reference strategy and the information object is a data reference.

According to another embodiment of the present invention, a system comprising, a source service, a target service a service bus having a processor operative to receive a request from a source service, determine whether the target service associated with the request supports a by-reference evaluation strategy, determine whether an information object associated with the request is a data reference, retrieve data associated with the reference from a database, add the data to the information object, and invoke the target service and pass the information object to the target service responsive to determining that the target service does not support the by-reference strategy and the information object is a data reference.

According to yet another embodiment of the present invention, a computer program product including a computer readable medium having computer executable instructions embodied therewith that, as executed on a computer apparatus, implement a method comprising, receiving a request from a source service, determining whether the target service associated with the request supports a by-reference evaluation strategy, determining whether an information object associated with the request is a data reference, retrieving data associated with the reference from a database, adding the data to the information object, and invoking the target service and passing the information object to the target service responsive to determining that the target service does not support the by-reference strategy and the information object is a data reference.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
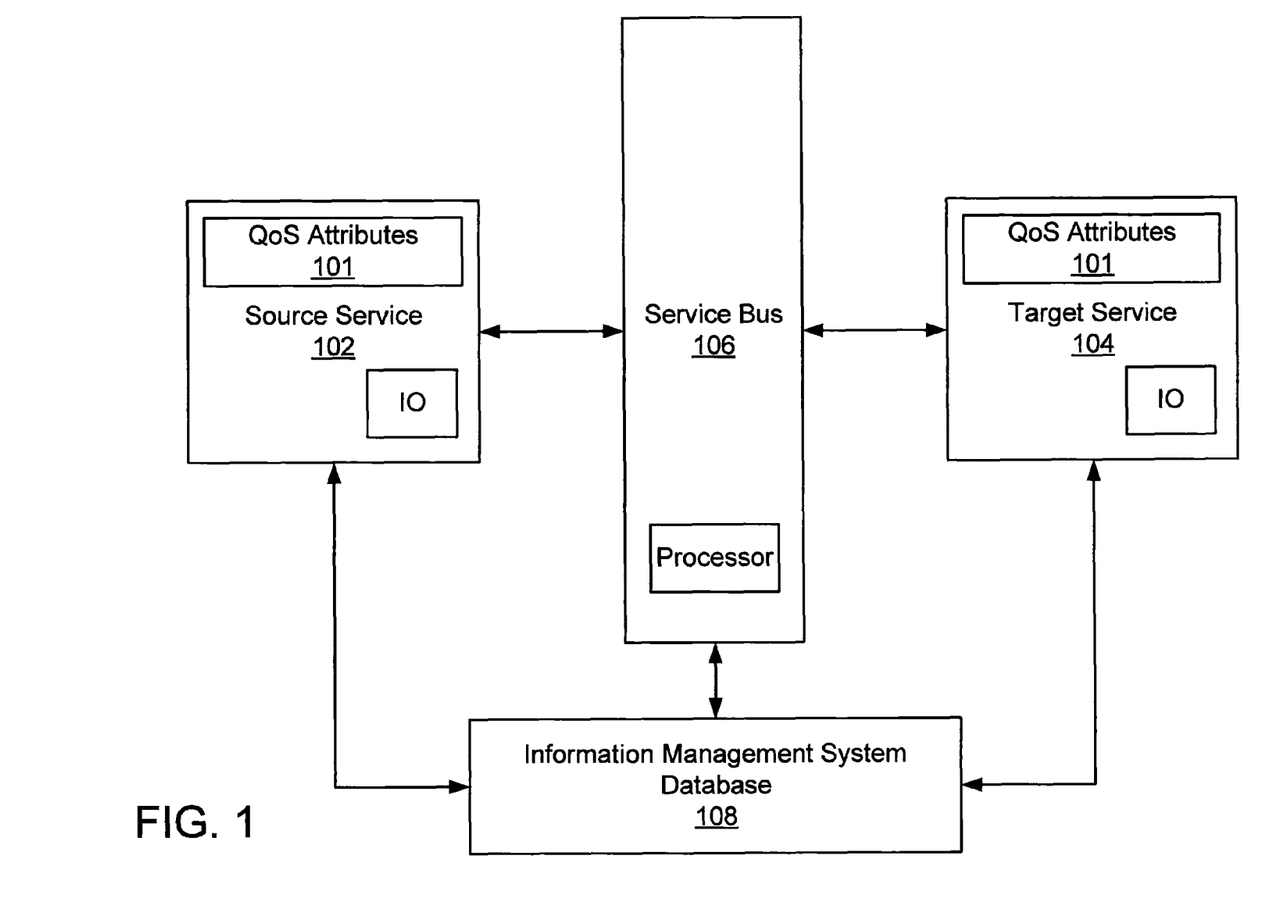
FIG. 1 is a block diagram illustrating an example of a SCA system.

FIG. 1 is a block diagram illustrating an example of a SCA system. The system includes a source service 102 and a target service 104 each having associated quality of service (QoS) attributes 101. The QoS attributes 101 include information that describes the parameters and operation of the service including, for example, whether the service operates with a by-value or by-reference evaluation strategy. The services are connected to a service bus 106 having a processor. The services may also be connected to an information management system database 108.

In the embodiments described below, when a developer wires services, the developer does interconnect a service retrieving and writing data. This reduces complexity and the amount of code to be maintained and increases consumability of the services. During processing of service invocations, the runtime infrastructure may decide whether references to the data can be passed to a service or if the data needs to be retrieved/written from/to the database before calling a service. This improves performance, because the runtime infrastructure can optimize the processing of service invocations with respect to data access.

The approach described below is built upon Service Component Architecture (SCA), Service Data Objects (SDO) a model for business data, and set references, a concept for referencing data stored in an Information System, e.g. database or Enterprise Information System.

A set reference is an abstraction of a business data, that is, a data description, and refers to a set which resides in some data source. For example, a set reference may refer to a table in a relational database system, a set of records in an Enterprise Information System or even an Excel sheet stored in the file system. When referring to a relational database table, the set reference contains, the reference to the data source in which the table resides, the table name, the database schema name (optional), and arbitrary properties (optional). Set references are defined with a XML Schema complex type. An example of an XML Schema complex type describing a set reference for a relational database table is shown below in Table 1. This makes it possible to pass them to other services so data can be shared by reference between different services. Table 2 shows an example of a concrete set reference for a relational database table:

In operation, the source service 102 sends requests to the target service 104. The service bus 106 processes the request and facilitates the communication of information objects and other data between the services.

Figure 2:
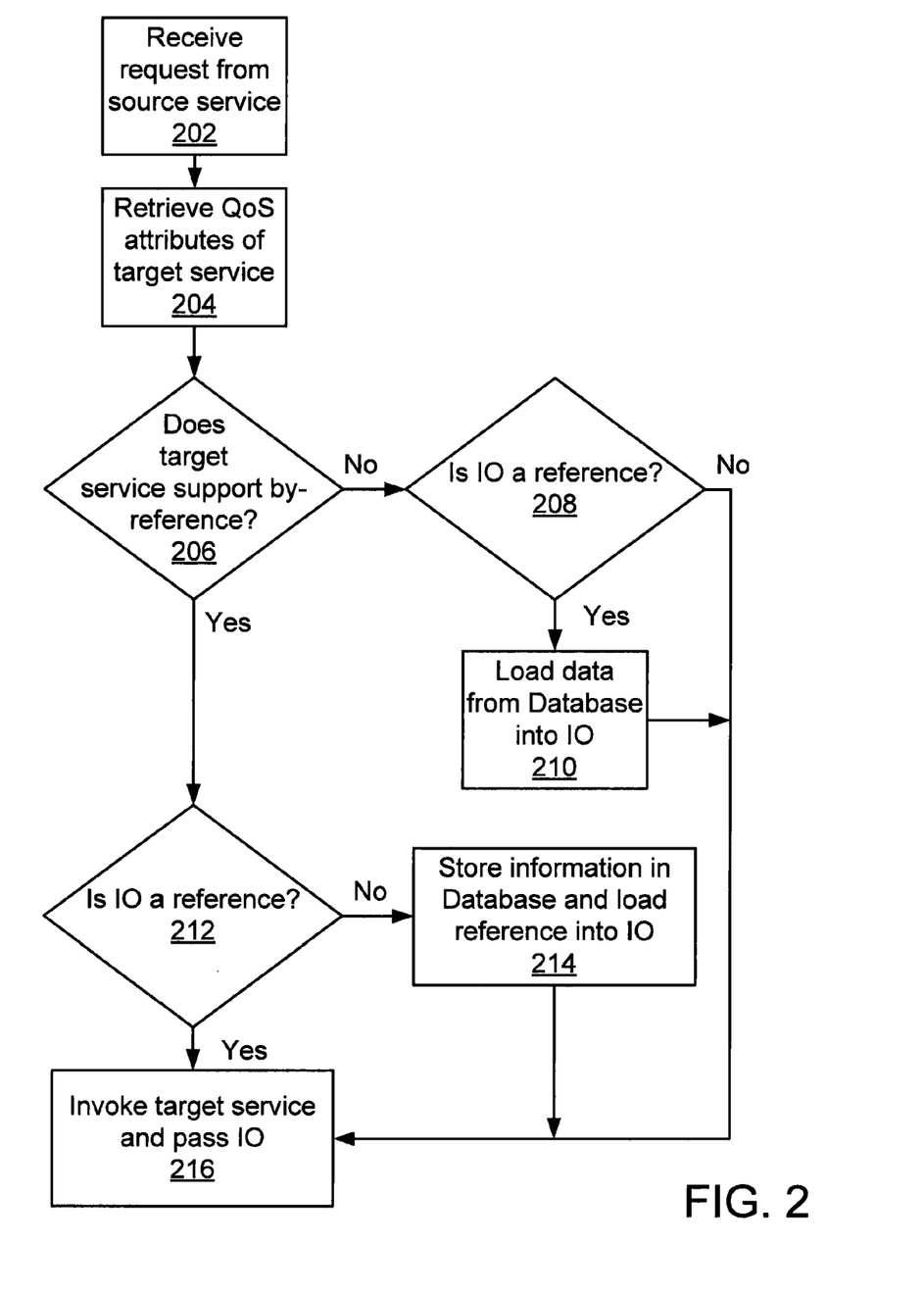
FIG. 2 is a block diagram illustrating an example of logic used in the SCA system.

FIG. 2 is a block diagram illustrating an exemplary embodiment of the logic used by the service bus 106. In block 202, a request is received from the source service 102. The request includes an identifier of the target service 104. In block 204, the service bus retrieves the QoS attributes 101 of the target service 104. In block 206, the service bus 106 determines whether the target service supports by-reference evaluation strategy. If yes, the service bus 106 determines whether the information object associated with the request is a reference. If yes, the target service 104 is invoked and the information object is passed from the source service 102 to the target service 104 via the service bus 106. If the information object is not a reference in block 212, the data from the information object is stored in the information management system data base 108, and the reference is added to the information object in block 214 and the data is removed from the information object. The information object may then be passed in block 216. In block 208, the service bus 106 determines whether the information object is a reference. If no, the information object is passed in block 216. If yes, the referenced data is retrieved from the information management system database 108 and added to the information object in block 210.

Figure 3:
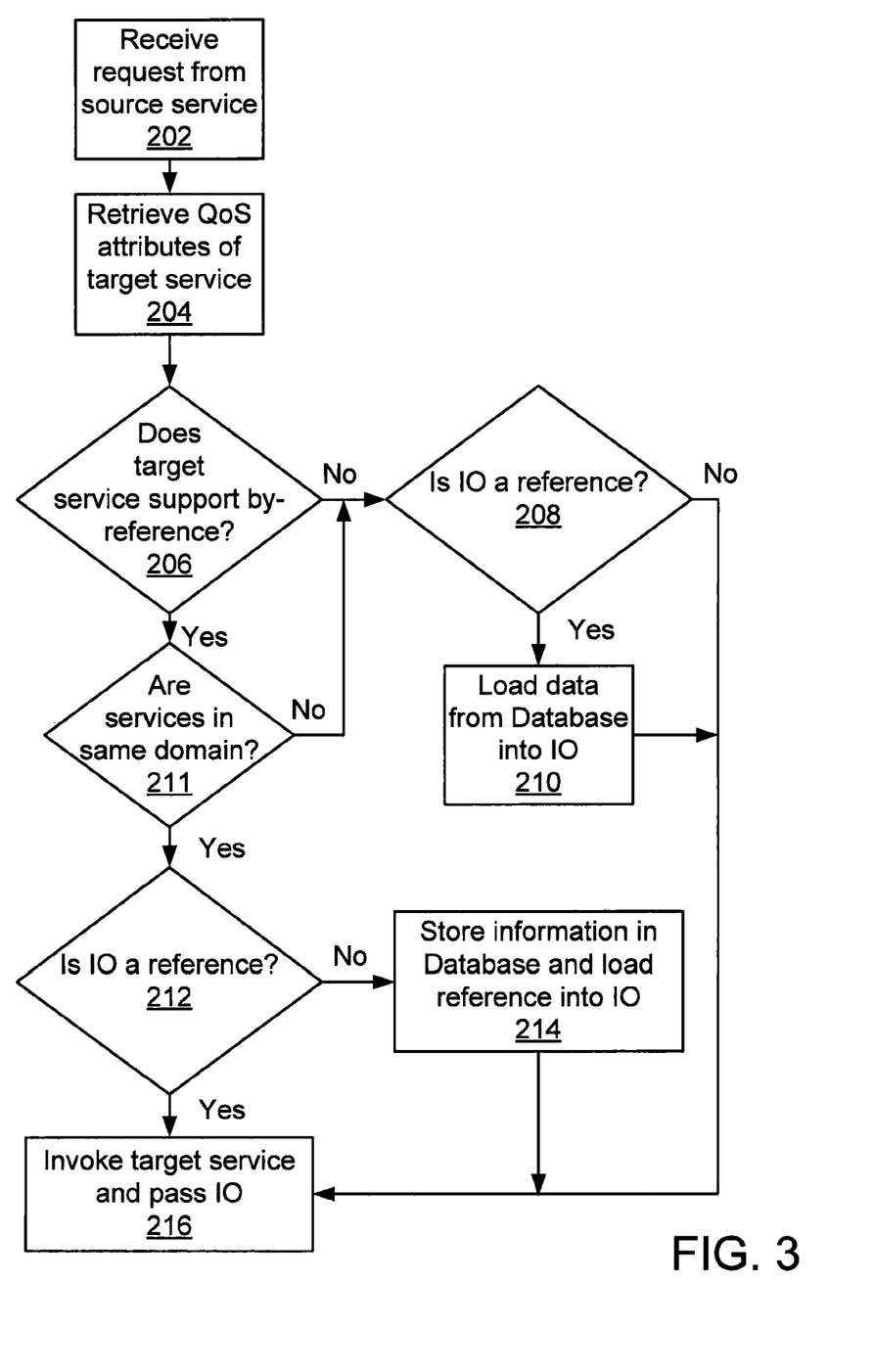
FIG. 3 is a block diagram illustrating an alternate example of logic used in the SCA system.

FIG. 3 illustrates an alternate exemplary embodiment of the logic used by the service bus 106. The illustrated embodiment is similar to the logic described above in FIG. 2, and includes a determination of whether the services share the same information domain in block 211.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

Example embodiments of the present invention may be implemented, in software, for example, as any suitable computer program. For example, a program in accordance with one or more example embodiments of the present invention may be a computer program product causing a computer to execute one or more of the example methods described herein: a method for simulating arbitrary software and/or unmodified code directly on a host processor.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for simulating arbitrary software and/or unmodified code directly on a host processor, in accordance with example embodiments of the present invention.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments of the present invention.

Example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as departure from the spirit and scope of the example embodiments of the present invention, and all such modifications as would be obvious to one skilled in the art are intended to be included within the scope of the following claims.

Although example embodiments of the present invention have been discussed herein with regard to specific applications and/or implementations, it will be understood that example embodiments may be utilized in, for example, in firm ASIC chip design or implemented in traditional circuitry.

Although example embodiments of the present invention have been shown and described with regard to certain operations (e.g., S114, S116, and/or S118 of FIG. 2) being performed serially or consecutively, it will be understood that any combination of these operations may be performed simultaneously and in parallel.

Although specific aspects may be associated with specific example embodiments of the present invention, as described herein, it will be understood that the aspects of the example embodiments, as described herein, may be combined in any suitable manner.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

TABLE 1

```
<element name="setReference" type="dma:tSetReference" />
<complexType name="tSetReference">
    <sequence>
        <element   name="setAddress" type="dma:tSetAddress"
                   minOccurs="0" maxOccurs="1" />
        <element   name="setProperties" type="anyType"
                   minOccurs="0" maxOccurs="1" />
    </sequence>
</complexType>
<complexType name="tSetAddress">
    <sequence>
        <element   ref="dma:dataSource" minOccurs="0"
maxOccurs="1" />
        <element   name="schema" type="dma:tSchemaName"
                   minOccurs="0" maxOccurs="1" />
        <element   name="table" type="dma:tTableName"
                   minOccurs="1" maxOccurs="1" />
    </sequence>
</complexType>
<element name="dataSource" type="dma:tDataSource"/>
<complexType name="tDataSource">
    <sequence>
        <element   name="jndiName" type="string"
                   minOccurs="1" maxOccurs="1" />
    </sequence>
</complexType>
<complexType name="tSchemaName">
    <sequence>
        <element   name="name" type="string"
                   minOccurs="0" maxOccurs="1" />
    </sequence>
</complexType>
<complexType name="tTableName">
    <sequence>
        <element   name="name" type="string"
                   minOccurs="0" maxOccurs="1" />
    </sequence>
</complexType>
```

TABLE 2

```
<dma:setReference>
    <dma:setAddress>
        <dma:dataSource>
            <dma:jndiName>/jdbc/iisample</dma:jndiName>
        </dma:dataSource>
        <dma:schema>
            <dma:name>IISAMPLE</dma:name>
        </dma:schema>
        <dma:table>
            <dma:name>EMPLOYEE</dma:name>
        </dma:table>
    </dma:setAddress>
</dma:setReference>
```

What is claimed is:

1. A method for enabling invocation of any of a plurality of target services in response to receipt of a plurality of requests from a source service, the plurality of target services including a first target service and a second target service, the plurality of requests including a first request and a second request, the method comprising:

receiving, by a service bus in a service component architecture (SCA) system, the first request from the source service, wherein the service bus includes a processor;

determining, by the service bus, that the first request includes a first identifier of the first target service;

retrieving, by the service bus, a first quality of service (QoS) attribute of the first target service;

determining, by the service bus, from first information included in the first QoS attribute, that the first target service does not support a by-reference evaluation strategy;

determining, by the service bus, that a first information object associated with the first request is a reference to a first table in a relational database;

retrieving, by the service bus, first data from the first table in the relational database before invoking the first target service;

adding, by the service bus, the first data to the first information object;

invoking, by the service bus, the first target service after adding the first data to the first information object;

passing, via the service bus, the first information object having the first data added thereto from the source service to the first target service;

receiving, by the service bus, the second request from the source service;

determining, by the service bus, that the second request includes a second identifier of the second target service;

retrieving, by the service bus, a second QoS attribute of the second target service;

determining, by the service bus, from second information included in the second QoS attribute, that the second target service supports the by-reference evaluation strategy;

determining, by the service bus, that a second information object associated with the second request is a reference to a second table in the relational database;

invoking, by the service bus, the second target service; and passing, via the service bus, the second information object from the source service to the second target service.

2. The method of claim 1, wherein the plurality of target services further includes a third target service and the plurality of requests further includes a third request, the method further comprising:

receiving, by the service bus, the third request from the source service;

determining, by the service bus, that the third request includes a third identifier of the third target service;

retrieving, by the service bus, a third QoS attribute of the third target service;

determining, by the service bus, from third information included in the third QoS attribute, that the third target service supports the by-reference evaluation strategy;

determining, by the service bus, that a third information object associated with the third request is not a reference to any table in the relational database;

retrieving, by the service bus, third data from the third information object before invoking the third target service;

storing, by the service bus, the third data in a third table in the relational database;

adding a reference to the third table to the third information object;

removing the third data from the third information object;
invoking, by the service bus, the third target service after removing the third data from the third information object; and
passing, via the service bus, the third information object having the reference to the third table added thereto from the source service to the third target service.

3. The method of claim 1, wherein the plurality of target services further includes a third target service and the plurality of requests further includes a third request, the method further comprising:
receiving, by the service bus, the third request from the source service;
determining, by the service bus, that the third request includes a third identifier of the third target service;
retrieving, by the service bus, a third QoS attribute of the third target service;
determining, by the service bus, from third information included in the third QoS attribute, that the third target service does not support the by-reference evaluation strategy;
determining, by the service bus, that a third information object associated with the third request is not a reference to any table in the relational database;
invoking, by the service bus, the third target service; and
passing, via the service bus, the third information object from the source service to the third target service.

4. The method of claim 1, wherein the first information object includes a first field that stores the reference to the first table in the relational database.

5. The method of claim 4, wherein the first information object includes a second field that stores the first data added to the first information object.

6. The method of claim 1, wherein the plurality of target services further includes a third target service and the plurality of requests further includes a third request, the method comprising:
receiving, by the service bus, the third request from the source service;
determining, by the service bus, that the third request includes a third identifier of the third target service;
retrieving, by the service bus, a third QoS attribute of the third target service;
determining, by the service bus, from third information included in the third QoS attribute, that the third target service supports the by-reference evaluation strategy;
determining, by the service bus, that a third information object associated with the third request is a reference to a third table in the relational database;
determining, by the service bus, that the source service and the third target service do not share the same information domain;
retrieving, by the service bus, third data from the third table in the relational database before invoking the third target service;
adding, by the service bus, the third data to the third information object;
invoking, by the service bus, the third target service after adding the third data to the third information object; and
passing, via the service bus, the third information object having the third data added thereto from the source service to the third target service.

7. A system for enabling invocation of any of a plurality of target services in response to receipt of a plurality of requests from a source service, the plurality of target services including a first target service and a second target service, the plurality of requests including a first request and a second request, the system comprising:
a service component architecture (SCA) system, the SCA system comprising:
the source service;
a relational database; and
a service bus having a processor operative to:
receive the first request from the source service;
determine that the first request includes a first identifier of the first target service;
retrieve a first quality of service (QoS) attribute of the first target service;
determine from first information included in the first QoS attribute that the first target service does not support a by-reference evaluation strategy;
determine that a first information object associated with the first request is a reference to a first table in a relational database;
retrieve first data from the first table in the relational database before invoking the first target service;
add the first data to the first information object;
invoke the first target service after adding the first data to the first information object;
pass the first information object having the first data added thereto from the source service to the first target service;
receive the second request from the source service;
determine that the second request includes a second identifier of the second target service;
retrieve a second QoS attribute of the second target service;
determine from second information included in the second QoS attribute, that the second target service supports the by-reference evaluation strategy;
determine that a second information object associated with the second request is a reference to a second table in the relational database;
invoke the second target service; and
pass the second information object from the source service to the second target service.

8. The system of claim 7, wherein the plurality of target services further includes a third target service and the plurality of requests further includes a third request, and wherein the processor is further operative to:
receive the third request from the source service;
determine that the third request includes a third identifier of the third target service;
retrieve a third QoS attribute of the third target service;
determine, from third information included in the third QoS attribute, that the third target service supports the by-reference evaluation strategy;
determine that a third information object associated with the third request is not a reference to any table in the relational database;
retrieve third data from the third information object before invoking the third target service;
store the third data in a third table in the relational database;
add a reference to the third table to the third information object;
remove the third data from the third information object;
invoke the third target service after removing the third data from the third information object; and
pass the third information object having the reference to the third table added thereto from the source service to the third target service.

9. The system of claim 7, wherein the plurality of target services further includes a third target service and the plurality of requests further includes a third request, and wherein the processor is further operative to:
- receive the third request from the source service;
- determine that the third request includes a third identifier of the third target service;
- retrieve a third QoS attribute of the third target service;
- determine from third information included in the third QoS attribute, that the third target service does not support the by-reference evaluation strategy;
- determine that a third information object associated with the third request is not a reference to any table in the relational database;
- invoke the third target service; and
- pass the third information object from the source service to the third target service.

10. The system of claim 7, wherein the first information object includes a first field that stores the reference to the first table in the relational database.

11. The system of claim 10, wherein the first information object includes a second field that stores the first data.

12. The system of claim 7, wherein the plurality of target services further includes a third target service and the plurality of requests further includes a third request, and wherein the processor is further operative to:
- receive a second the third request from the source service;
- determine that the third request includes a third identifier of the third target service;
- retrieve a third QoS attribute of the third target service;
- determine from third information included in the third QoS attribute, that the third target service supports the by-reference evaluation strategy;
- determine that a third information object associated with the third request is a reference to a third table in the relational database;
- determine that the source service and the third target service do not share the same information domain;
- retrieve third data from the third table in the relational database before invoking the third target service;
- add the third data to the third information object;
- invoke the third target service after adding the third data to the third information object; and
- pass the third information object having the third data added thereto from the source service to the third target service.

13. A computer program product including a non-transitory computer readable medium having computer executable instructions embodied therewith that, as executed on a computer apparatus, implement a method for enabling invocation of any of a plurality of target services in response to receipt of a plurality of requests from a source service, the plurality of target services including a first target service and a second target service, the plurality of requests including a first request and a second request, the method comprising:
- receiving, by a service bus in a service component architecture (SCA) system, the first request from the source service, wherein the service bus includes a processor;
- determining, by the service bus, that the first request includes a first identifier of the first target service;
- retrieving, by the service bus, a first quality of service (QoS) attribute of the first target service;
- determining, by the service bus, from first information included in the first QoS attribute, that the first target service does not support the by-reference evaluation strategy;
- determining, by the service bus, that a first information object associated with the first request is a reference to a first table in a relational database;
- retrieving, by the service bus, first data from the first table in the relational database before invoking the first target service;
- adding, by the service bus, the first data to the first information object;
- invoking, by the service bus, the first target service after adding the first data to the first information object;
- passing, via the service bus, the first information object having the first data added thereto from the source service to the first target service;
- receiving, by the service bus, the second request from the source service;
- determining, by the service bus, that the second request includes a second identifier of the second target service;
- retrieving, by the service bus, a second QoS attribute of the second target service;
- determining, by the service bus, from second information included in the second QoS attribute, that the second target service supports the by-reference evaluation strategy;
- determining, by the service bus, that a second information object associated with the second request is a reference to a second table in the relational database;
- invoking, by the service bus, the second target service; and
- passing, via the service bus, the second information object from the source service to the second target service.

14. The computer program product of claim 13, wherein the plurality of target services further includes a third target service and the plurality of requests further includes a third request, the method further comprising:
- receiving, by the service bus, the third request from the source service;
- determining, by the service bus, that the third request includes a third identifier of a second the third target service;
- retrieving, by the service bus, a third QoS attribute of the third target service;
- determining, by the service bus, from third information included in the third QoS attribute, that the third target service supports the by-reference evaluation strategy;
- determining, by the service bus, that a third information object associated with the third request is not a reference to any table in the relational database;
- retrieving, by the service bus, third data from the third information object before invoking the third target service;
- storing, by the service bus, the third data in a third table in the relational database;
- adding a reference to the third table to the third information object;
- removing the third data from the third information object;
- invoking, by the service bus, the third target service after removing the third data from the third information object; and
- passing, via the service bus, the third information object having the reference to the third table added thereto from the source service to the third target service.

15. The computer program product of claim 13, wherein the plurality of target services further includes a third target service and the plurality of requests further includes a third request, the method further comprising:
- receiving, by the service bus, the third request from the source service;
- determining, by the service bus, that the third request includes a third identifier of a second the third target service;

retrieving, by the service bus, a third QoS attribute of the third target service;

determining, by the service bus, from third information included in the third QoS attribute, that the third target service does not support the by-reference evaluation strategy;

determining, by the service bus, that a third information object associated with the third request is not a reference to any table in the relational database;

invoking, by the service bus, the third target service; and passing, via the service bus, the third information object from the source service to the third target service.

16. The computer program product of claim 13, wherein the first information object includes a first field that stores the reference to the first table in the relational database.

17. The computer program product of claim 13, wherein the plurality of target services further includes a third target service and the plurality of requests further includes a third request, the method further comprising:

receiving, by the service bus, the third request from the source service;

determining, by the service bus, that the third request includes a third identifier of the third target service;

retrieving, by the service bus, a third QoS attribute of the third target service;

determining, by the service bus, from third information included in the QoS attribute, that the third target service supports the by-reference evaluation strategy;

determining, by the service bus, that a third information object associated with the third request is a reference to a third table in the relational database;

determining, by the service bus, that the source service and the third target service do not share the same information domain;

retrieving, by the service bus, third data from the third table in the relational database before invoking the third target service;

adding, by the service bus, the third data to the third information object;

invoking, by the service bus, the third target service after adding the third data to the third information object; and passing, via the service bus, the third information object having the third data added thereto from the source service to the third target service.

\* \* \* \* \*